3,146,608
COOLING DEVICE
Harry W. Carpenter, 121 S. Lark Ellen Ave.,
West Covina, Calif.
Filed Aug. 19, 1963, Ser. No. 302,934
11 Claims. (Cl. 62—293)

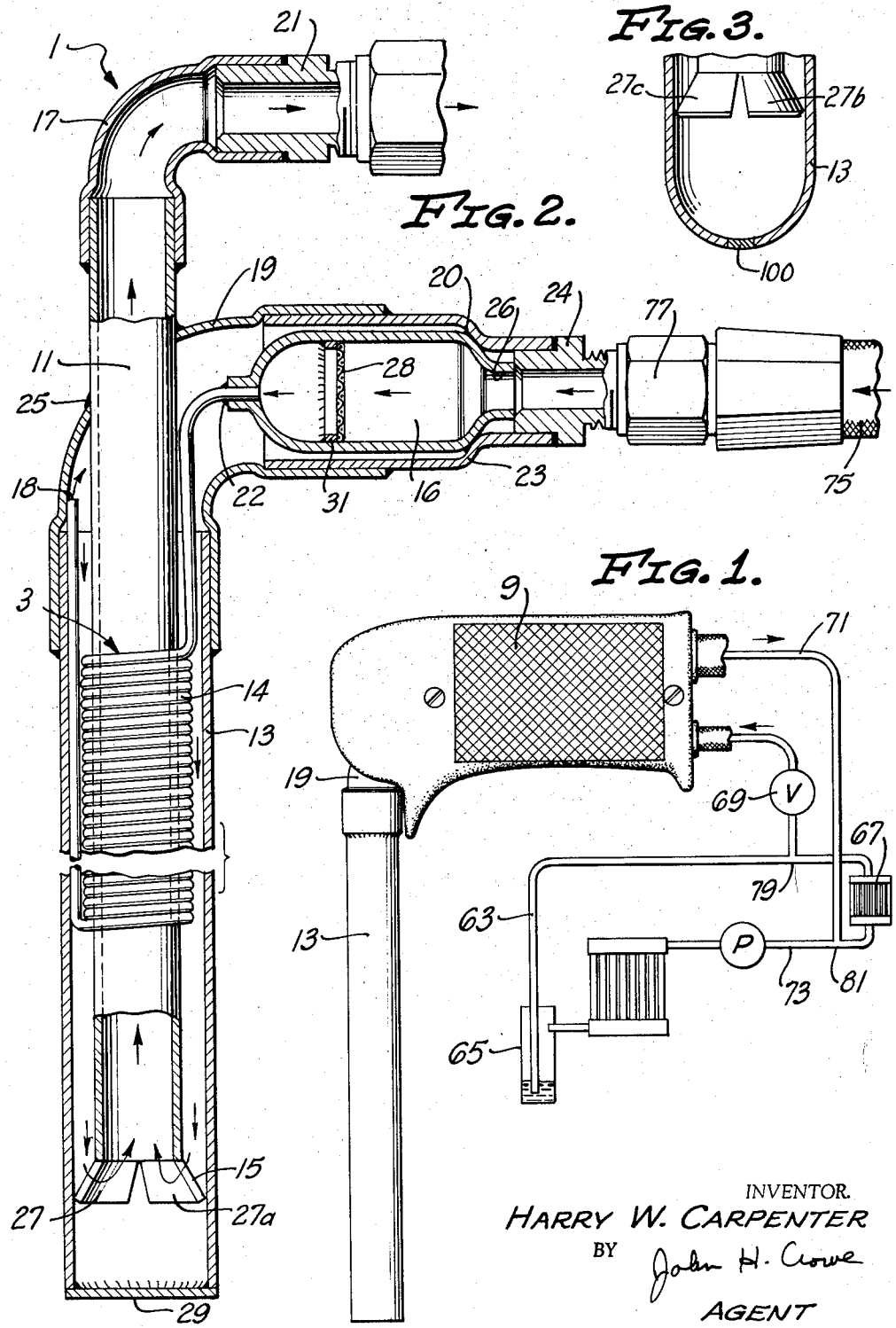

This invention relates to an immersion-type refrigerative cooler, or cooling device, and particularly to such a device which operates on refrigerant borrowed from a conventional automobile air-conditioning system or the like. The cooler of this invention is intended to be used primarily for the cooling of beverages, such as water, tea, etc., in moving automobiles, trucks, tractors, and other vehicles.

The need of a simple, convenient means of preparing cool beverages, or other liquids, in moving vehicles, particularly during the hot summer months, is well recognized. At the present time, no completely satisfactory means of this sort is, to my knowledge, available, and consequently motorists, truck drivers, aircraft pilots, speedboat passengers and other operators or passengers of vehicles of various types have been forced to rely upon thermos or vacuum bottles, sometimes with the auxiliary aid of ice, to serve their beverage cooling needs. There are several disadvantages to the use of these expedients. For one thing, thermos bottles, or other insulated containers, keep liquids cool for only limited periods of time, after which heat leakage through their insulated walls causes the liquids to lose their chill and become increasingly less refreshing, thirst quenching and satisfactory. The use of ice for beverage cooling purposes is not completely satisfactory because it is inconvenient to carry and messy to use, and, in addition, it dilutes drinks to which it is added. Furthermore, ice will not last indefinitely at summer temperatures, even when well insulated, and it is not always readily available when most needed or desired.

I have now discovered a simple and extremely effective cooling device, operative at a moment's notice, for use in a moving automobile, or other vehicle, by means of which liquids for beverages, or the beverages themselves, such as for example, tea, coffee, milk, lemonade, beer, carbonated beverages, etc., can be cooled to refreshingly satisfying temperatures without the necessity of stopping the vehicle. As indicated above, the cooling device of this invention is particularly adapted to utilize refrigerant from an independently existing refrigeration system, and hence is optimumly suitable for use in those vehicles containing such a system, such as, for example air-conditioned automobiles. The term "air-conditioned" as employed herein, is intended to designate refrigerative, as opposed to evaporative, cooling means.

My cooling device is of such compactness and simplicity of design as to lend itself readily to installation in the driver's compartment of an air-conditioned motor-car, or other vehicle, so as to be readily available for use when needed, but otherwise tucked away in an accessible but relatively inconspicuous place, such as the space under the dashboard. The cooling device operates in the same manner as any conventional refrigerating system in that it effects heat removal from liquids through the medium of a heat absorbing refrigerant, the refrigerant absorbing most of the heat in the process of evaporating as it expands from a confined space.

It should be emphasized that the cooling device is not limited to use in automobiles but may be utilized as an accessory to, or in combination with, any vehicle having an air-conditioning system or the like. This classification includes airplanes, boats and ships, submarines, trains, trucks, space capsules, and numerous vehicles other than automobiles. In this connection, I wish to make it clear that while my cooling device is intended primarily for uses incidental to vehicle operation, its function is not so limited, and it can be employed for similar uses incidental to the operation of any refrigeration system, whether or not it is attached to a vehicle.

The only essential requirement for successful operation of the cooling device is that a compressed refrigerant be available for use therein. The refrigerant can come from any source, and thus there is no necessity that it be borrowed from a refrigeration system existing primarily for another purpose. It is preferable, however, to have compression and cooling means available to continuously reconvert gaseous refrigerant from my device to liquid form for recycle purposes, unless there is an adequate supply of liquid refrigerant available at a low enough cost to make it economically feasible to immediately dispose of the refrigerant in some way other than by recycle use. These aspects of my invention will be more readily understandable from the detailed description of the invention to follow. Suffice it to say that my cooling device is not dependent upon any particular type of refrigerant supply source or system, and that it can be used in conjunction with a refrigeration system intended primarily for a separate purpose (such as an automobile air-conditioning system), its own specific refrigerating means, or any other source of suitable liquid refrigerant and cooperating gaseous effluent disposal means.

It is a principal object of this invention to furnish a simple, inexpensive, and practical means of rapidly cooling beverages or the like in moving vehicles.

It is another object of the invention to furnish such a cooling means capable of utilizing a refrigerant from an automobile air-conditioning system to accomplish its cooling function.

Other objects, features, and advantages of the invention will be apparent from the following description taken in conjunction with the accompanying drawings, in which:

FIGURE 1 shows a preferred embodiment of a refrigerative cooling device in accordance with this invention operatively connected to an automobile air-conditioning system, the cooling device being shown in elevational view, and the air-conditioning system being schematically depicted;

FIGURE 2 is an interrupted, longitudinal view, mostly in section, of a cooling device in accordance with this invention; and FIGURE 3 is a fragmentary longitudinal view, showing, mostly in section, an alternative type of end closure on a cooling device otherwise corresponding to that of FIGURE 2.

Proceeding now to a description of the drawings, FIGURE 2 shows a cooling device 1 in accordance with this invention having an inner-within-an-outer tube cooling element 3 through which a refrigerant flows in tortuous progression along the pathways indicated by the directional arrows on the drawing. Cooling element 3 comprises an inner tube 11 concentrically disposed within a larger outer tube 13, the lower end 15 of the former being in open communication with the interior of the latter, and a capillary tube 14 spirally wound around inner tube 11. Hereinafter, the terms "lower" and "upper" as applied to parts of the pictured cooling device are used in terms of reference to the normal operating position of the device which corresponds to that depicted in the drawings. Capillary tube 14 extends from the upper end of its spirally wound portion to juncture with a screen chamber 16 from which it receives liquid refrigerant, and from the lower end of its spirally wound portion, it extends upwardly to a termination point 18 near the top of outer tube 13. Capillary tube 14 is intentionally open at termination point 18 to permit venting of the refrigerant to the annular space between inner tube 11 and outer tube 13 for reasons hereinafter made clear.

Fitted to the upper ends of inner tube 11 and outer tube 13, respectively, are elbows 17 and 19. The axial plane of symmetrical bisection of elbow 17 is coexistent with that of elbow 19 so that the axes of the vertical legs of the two elbows are coexistensive, the axes of the horizontal legs are parallel, and all four legs fall on a common plane. The terms "vertical" and "horizontal" as here applied are used in a sense comportive with the normal operating position of the cooling device. Fixedly secured to the open end of the horizontally disposed leg of inner tube elbow 17, by a tight friction fit plus silver soldering or equivalent holding and sealing means, is a conical-end fitting 21. A concentric reduces 23 is snugly fitted into the open end of the horizontal leg of outer tube elbow 19 and silver soldered, or otherwise sealingly secured, in place therein. Because of the geometrical relationship of elbows 17 and 19, the axes of conical-end fitting 21 and reducer 23 are parallel. Sealingly joined by silver solder or equivalent means to the outwardly extending end of reducer 23 is a conical-end fitting 24 of smaller bore than that of conical-end fitting 21.

Disposed within the area enclosed by the large bore section of reducer 23 is a screen chamber 16 of generally cylindrical shape, necked down to narrow openings at both ends as shown. Screen chamber 16 is positioned in generally coaxial relationship with reducer 23 and the horizontal leg of elbow 19 and, as previously indicated, one end of capillary tube 14 is connected thereto, the connection being effected by insertion of the capillary tube into one of the necked down openings of the chamber. The connection is sealed, preferably by silver solder or equivalent means as shown at 22 on FIGURE 2. The oppositely necked end of screen chamber 16 abuts the funnel-like portion of wall in reducer 23 intermediate its larger and smaller sections, as shown at 20, and its neck opening, shown at 26, is larger than that to which capillary tube 14 is joined. The reasons for this will presently become apparent.

Transversely secured within screen chamber 16 by combined friction fit and solder means, is a filter screen 28 having openings of smaller size than the cross-sectional flow area of capillary tube 14, and a collar-like ring 31 integrally attached to said screen around its circumferential edge. The function of filter screen 28 is to remove solid impurities of particle size large enough to block the flow of liquid refrigerant within capillary tube 14 from the feed refrigerant to my cooling device. Chamber 16, in addition to housing screen 28, provides an adequate retention space for solids filtered from the flowing refrigerant until they accumulate to such an extent as to require removal from the system. Normally the accumulation of solids is a relatively slow process and screen chamber 16 has adequate capacity to permit operation of the device for long periods of time before any solids-removing steps become necessary. When it finally becomes necessary or desirable to remove the filter solids from chamber 16, this can be accomplished with little difficulty by a back flushing technique such as, for example, one employing a vacuum to suck them (the unwanted solids) out. No detailed description of back flushing is included here, since back flushing procedures are well known, and, additionally, because it is felt that the utilization of any such procedure in conjunction with the use of my invention is a matter well within the skill of those versed in the appropriate arts, particularly in the light of present teachings.

The functions of the various parts of my cooling device heretofore and hereinafter referred to will become apparent, if not already or initially so, as the description of my invention proceeds.

Inner tube 11 is fixedly secured in position mostly within, but partly protruding from, the upper end of outer tube 13. The means of securing inner tube 11 within outer tube 13 consists partly of a physical seal 25 between it and the peripheral edge of a properly sized hole in elbow 19 through which it projects as shown, and partly by four ears, two of which are shown at 27 and 27a, projecting laterally outwardly from its lower end, in funnel-like divergence therefrom, a sufficient distance to make supportable bearing contact with the inner surface of outer tube 13. For reasons presently advanced, a preferred material of construction of the inner, outer, and capillary tubes of cooling element 3 is preferably a metal, or metal alloy, of good heat transfer properties, typical of which is copper. Where copper or its equivalent is employed, sealing contact 25 between inner tube 11 and the edge of the hole in elbow 19 through which it protrudes is preferably accomplished by soft or silver solder means, the latter being superior in that it makes for a stronger bond. By the same token, the various other parts of my cooling device, except for certain obvious exceptions, are preferably made of copper or an equivalent metal or alloy of favorable heat transfer properties.

Since the first choice of material of construction for most of the parts of my cooling device is copper, a satisfactory, and preferred, way of joining the parts where necessary is by soldering, and preferably silver soldering, means. These preferences as to construction materials and joining means explain the repeated references hereinabove to soldered joints between certain parts of my cooling device. However, I wish to make it clear that such references have been included for illustrative purposes only, and that no limiting implications should be attached thereto. If metals other than those readily amenable to soldering are employed for the construction of some or all of the parts of my cooler, suitable means of joining the cooler parts other than soldering are, of course, within the scope of my invention.

Referring again to the aforesaid ears, these are preferably fashioned from the lower end of inner tube 11 by making two axially coextensive saw cuts therein, on perpendicularly intersecting planes, and then bending the four resulting flaps outwardly for a sufficient distance to serve as lateral contact members of adequate strength and rigidity to firmly center and help support inner tube 11 within outer tube 13. There are, of course, numerous other ways of making the ears, or equivalent lateral contact members, as, for example, by appropriately starring, notching, or cutting the lower end of inner tube 11 to produce strips or flaps which can be bent outwardly in the manner, and for the purpose, indicated above.

The lower end of cooling element 3 is enclosed by a flat cap 29, silver soldered, or otherwise suitably fastened, in place in the manner shown. The cap closure must, of course, be sealed against leakage of the refrigerant used in the element.

There are various ways in which the component parts of cooling element 3 can be made and assembled and all are, of course, within the scope of my invention. Some of these various methods will be discussed hereinafter and others will be obvious to those skilled in the art. One method of assembling such a cooling element is to first obtain a section of standard tubing, preferably copper, of desired length and diameter for outer tube 13, and a standard elbow fitting of appropriate size to serve as elbow 19. A hole of proper size and position to receive inner tube 11 in its finally assembled position in the cooling device is then cut in elbow 19. For simplicity of explanation, the component parts here discussed will be denoted by the numbers of their corresponding counterparts on FIGURE 2. Next, a section of standard copper, or other suitable, tubing of sufficient length and diameter for inner tube 11 is obtained and one end is eared by the sawing and flap bending technique described above.

A cylindrical screen chamber, necked at both ends and having an internal screen of suitable mesh size, of copper or the like material, is obtained for use as chamber 16. A preformed spiral coil of capillary tubing, of sufficient coil diameter and length to snugly receive inner tube 11 in its hollow center and enclose it for the desired proportion of its length (theoretically the coil can enclose the tube for any proportion of its length) and having sufficiently long end extensions for its intended purposes, hereinafter disclosed, is obtained. The length of tube extending from the lower end of the coil is bent sharply to extend upwardly in close proximity to the outer surface of said coil, and is of such length as to terminate at the relative distance above the top of the coil indicated on FIGURE 2 upon final assembly of the device. The capillary tube extension from the upper end of the spiral coil is bent so as to be readily threadable through elbow 19. The upper end of the coil is then inserted into the opening of the vertical leg of elbow 19 a sufficient distance to permit threading of said capillary tube extension through the elbow far enough to be insertable into the smaller of the two necked openings in screen chamber 16. The tip end of the capillary tube extension is then inserted into the smaller screen chamber opening, and sealed in place therein by silver solder or equivalent means.

The preformed coil of capillary tubing is next pulled out of elbow 19 a sufficient distance to properly seat screen chamber 16 partially within the horizontal leg of the elbow in the position shown on FIGURE 2. The lower end of the capillary coil is inserted into outer tube 13 and the latter then pushed to its properly seated position in elbow 19. Inner tube 11 is inserted, uneared end first, into the open end of outer tube 13, through the hollow center of the capillary coil and out through the hole in elbow 19 made for that purpose. The eared end of inner tube 11 is urged upwardly within outer tube 13 until it has reached its prearranged position therein.

Next, reducer 23 and conical-end fitting 24 are joined together in the previously taught manner and fitted in place with the large end of the reducer in the appropriate opening of elbow 19 as shown on FIGURE 2. The fitting connections between outer tube 13 and elbow 19 and reducer 23 and elbow 19 are soldered, or otherwise sealingly secured.

In bending out the flaps that result from the saw cuts in inner tube 11 to form ears 27, 27a, etc., care must be taken to bend them beyond the point at which the eared tube end can be inserted into outer tube 13 with little or no binding contact therebetween. Thus, when the eared inner tube is pulled into place within outer tube 13, ears 27, 27a, etc., are squeezed together and thereby placed under sufficient compression to position and retain the confined end of said inner tube in its properly concentric relationship within outer tube 13.

The next step of the assembly is to silver solder, or otherwise appropriately secure, inner tube 11 to elbow 19 around the edge of the hole in the latter through which it passes. Finally, the open lower end of outer tube 13 is enclosed by covering it with a suitably sized cap 29, and silver soldering, or otherwise fixedly securing the cap in this position. Where the method of attaching the cap is soldering, the preferred technique is to first clean, or tin, the inside of the open end of outer tube 13 by dipping it into hot liquid solder for about a quarter of an inch; then to clean, or tin, the cap by dipping it in hot liquid solder; then place the cap in its intended position over the open end of the tube (the cap should preferably have a diameter substantially equal to the outer diameter of the tube) and; lastly, to apply heat to the outside of the tube near its cap-enclosed end. When the solder flows, the heat should be removed. Following this procedure will result in migration of the solder within outer tube 13 to its inner periphery of contact with cap 29 and consequent formation of a fillet around the same when the solder cools. The fillet acts to firmly secure the cap to the tube and form a seal therebetween. FIGURE 2 shows a solder fillet of the type described.

FIGURE 3 shows a type of closure for the outer tube alternative to the cap-type closure of FIGURE 2, said outer tube being designated here, as elsewhere in the drawings, by the numeral 13. The FIGURE 3 closure is prepared by spinning the outer tube down to the smallest possible opening and then closing that opening with solder, preferably silver solder, or the like. The resultant solder, or equivalent, filling is shown at 100 and two ears, similar in kind but not relative viewing positions to ears 27 and 27a on FIG. 1, are shown at 27b and 27c on FIG. 3.

The FIGURE 2 cooling device is employed by circulating a refrigerant therethrough in a manner as hereinafter described. Any well-known refrigerant, such as one of the Freon refrigerants, sometimes referred to by their numeral designations only (Freon-12 being called refrigerant 12; Freon-22, refrigerant 22; etc.) will suffice for this purpose. The term "Freon" is a trademarke designation for the class of fluorochloromethane and fluorochloroethane refrigerants; Freon-12, for example, being dichlorodifluoromethane.

The refrigerant is introduced into the cooling device in liquid form through screen chamber 16 from a standard refrigeration, or equivalently suitable, hose 75 which is coupled to conical-end fitting 24 by means of a standard female fitting 77 attached to the end of the hose. The entering refrigerant is prevented from migrating into the annular space between the outer wall of screen chamber 16 and the surrounding inner wall of the large-bore section of reducer 23 by the previously mentioned sealing relationship between the screen chamber and the reducer around the annulus of contact 20 therebetween.

As previously indicated, and shown on FIGURE 2 by directional arrows, the liquid refrigerant entering my cooler flows through the screen in screen chamber 16, which filters solid particles therefrom, and then into capillary tube 14. From there the refrigerant flows through the spiral coil section of the capillary tube and then upwardly to its opposite terminus (terminus 18) from whence it escapes into the annular space between the inner wall of the vertical leg of elbow 19 and the outer wall of inner tube 11. The liquid refrigerant is, of course, fed to screen chamber 16 under appropriate conditions of pressure and temperature to force it through the flowpath described, such conditions being inherently present in liquid refrigerant bled from an automobile air conditioning system, as those skilled in the art will appreciate.

As the liquid refrigerant flows through capillary tube 14 it picks up heat from its surroundings, and when it escapes therefrom, at terminus 18, the pressure on the liquid is suddenly reduced. Because of these factors, plus the fact that the temperature within cooling element 3 outside of capillary tube 14 is sufficiently high, the liquid refrigerant evaporates as it leaves the capillary tube, and in so doing extracts heat from the surroundings. It will be appreciated by those familiar with refrigeration technology that in using capillary tube 14 in the described manner, the exhaustion of liquid refrigerant therefrom has an effect similar to that of an expansion valve in a conventional refrigeration system. As the evaporating liquid refrigerant fills the internal area of element 3 surrounding the capillary tube, it generates sufficient pressure to force vaporized refrigerant into the lower end 15 of inner tube 11, upwardly therein to elbow 17 and from there through conical end fitting 21 and into a suitable effluent refrigerant hose, not shown, coupled thereto by suitable means. The refrigerant thus exhausted from the cooling device is returned to the automobile air conditioning system, or other source of its origin, or conveyed elsewhere through said hose.

As previously indicated, conical-end fitting 21 is of larger internal diameter than conical-end fitting 24, the port of entry of the refrigerant into the pictured cooling device. The reason for this, as will now be apparent, is because the refrigerant enters the cooling element 3 as a liquid and is exhausted as a gas, thereby requiring a larger exit passageway than entry port. In this connection, it should be clearly understood that the described and pictured refrigerant-routing arrangement is not the only one suitable for my purpose, and that there are various alternative arrangements within the scope of my invention which accomplish substantially the same result. As an example, the FIGURE 2 refrigerant routing scheme could be altered in such fashion as to reverse the ports of refrigerant entry and exit by judicious redesign of the cooler consistent with the principles of operation taught herein.

Turning now to FIGURE 1, there is shown a cooling device in accordance with this invention, fitted with a pistol-grip handle 9 (discussed in greater detail below), tied into a typical automobile air conditioning system in such a way as to permit the bleeding of refrigerant in suitably pressurized liquid form for use in the cooling device therefrom, and the return of the refrigerant in gaseous form thereto after it has served its purpose in the cooling device. To effect this result, liquid refrigerant is bled from the air conditioning system downstream of a liquid receiver tank 65 through a T connection 79 in line 63, line 63 being one which carries liquid refrigerant from the liquid receiver tank to an evaporator coil 67 in the system. Liquid flow control into cooling element 3 (for simplicity's sake, like numerals will be used to designate like parts in FIGURES 1 and 2 is effected by means of a valve 69 positioned as shown in the line running from T 79 to the cooling device. Evaporated exhaust refrigerant from cooling element 3 is returned to the air-conditioning system through a suitable line 71 T'd into the system at the point 81 in line 73 which runs from evaporator coil 67 to a compressor P, as shown.

Valve 69 is intended for use primarily for temperature control of the cooling element. While temperature control is not absolutely essential, it is desirable, particularly where the cooler is employed in containers of two-quart capacity or smaller. Alternatively, thermostatic control can be used instead of the manual type of control valve illustrated in FIGURE 1. There are various types of thermostatic controls known to those skilled in the art which could be employed conjunctively with my cooling device. One way of achieving effective thermostatic temperature control would be to mount a suitable thermostat, such as a diaphragm-type one, in the liquid refrigerant feed line to the cooler. Such thermostatic temperature control means for captive liquids are well known and require no detailed description here to teach those skilled in the art the essentials of installing and utilizing them in the practice of my invention. For this reason, plus the fact that such temperature control means are merely optional, and not critical or essential to the cooling device of this invention, no further discussion thereof will be included here. For somewhat similar reasons, it is felt unnecessary to here go into any involved discussion of conventional air conditioning systems suitable as "lending" sources of refrigerants for use in my cooling device.

Because of the low temperatures achieved by my cooler, a pistol-grip handle 9 is preferably provided therefor to assure ease and safety of handling the unit. Here, as previously herein, the discussion will, for reasons of simplicity of explanation, refer to various parts of my cooling device by the numerals assigned to their specific drawing counterparts. Pistol-grip handle 9 is preferably designed and positioned to enclose the fittings between conical-end fittings 21 and 24 and the hoses which tie the cooling device to an air conditioning system or its functional equivalent. Pistol-grip handle 9 is made of an insulating material, such as a suitable thermosetting plastic, to permit ready handling of the cooling device without discomfort or injury to the hands. One, but by no means the only, type of pistol-grip handle suitable for my purposes comprises two matching halves, with hollowed-out interior portions designed to fit around the fittings they are intended to enclose, fastened together by means of one or more screws or equivalent fastening devices. The pistol-grip handle of FIGURE 1 is of this type.

My novel cooling device is intended primarily for use in the cooling of liquids in thermos bottles or similar beverage containers, and it is employed by merely inserting its cooling element through the neck of the container and into the liquid contents thereof. The device is left in the container sufficiently long to cool the liquid to the desired temperature. This is normally a fairly short period of time, since the cooling action is fast and efficient. If desired, the cooling device can be held in place within the thermos bottle, or other container, by means of a slidable grommet of a size suitable to fit snugly around the immersible portion of the cooling element (sometimes hereinafter referred to as the immersion element) and fit tightly, but not bindingly, into the neck of the container. The grommet should preferably be adjusted to a proper position to maintain the bottom of the immersion element a short distance above the bottom of said container. It is preferred, particularly in the case of thermos bottles, that the immersion element not extend all the way to the bottom of the container since contact therewith creates a slight danger of breakage and, moreover, cuts down on the efficacy of heat transfer through the bottom of the immersion element.

The slidable grommet is preferably made of an elastic insulating material of a type substantially unaffected by extremes of cold, such as polyethylene, nylon, polyester, Teflon, etc. The selection of a proper grommet material requires no special knowledge or skill, since many elastic materials and their properties of resistance to low temperatures, as well as many other of their characteristics, are well known.

As an optional feature, the bottom tip of the immersion element of my cooling device can be enclosed with a tight-fitting but removable cap of shock absorbing material, such as a suitable rubber or plastic, to prevent or minimize the chance of breakage in the event the end of the element is accidentally caused to contact the internal wall of a thermos bottle or other containing vessel in which it is employed. The presence of such a cap, however, has a disadvantage in that it cuts down on the amount of effective heat transfer surface immersed in the liquid being cooled since the cap acts as a temperature, as well as a shock, insulator.

The cooling device of this invention can, of course, be of any size within reason. However, its preferred use, as previously indicated, is for the rapid cooling of beverages in thermos bottles or equivalent containers, and as many motorists will attest, the one-quart thermos bottle is a most conveniently sized container for carrying lemonade, tea, plain water, or the like, in automobiles because of its normally adequate capacity and relative compactness. Consequently, I have tentatively chosen the one-quart thermos bottle as the size container with which my cooling device will probably find its greatest usefulness and employing this as a standard, have designed a cooling device optimumly sized, it is believed, for most ordinary purposes. Subject to the indicated limitations, my cooling device of preferred size is such that its immersion element readily fits into the neck of a one-quart thermos bottle but does not quite reach the bottom when fully inserted therein. In this connection, it should be emphasized that my cooling device can be inserted into a container to any desired depth. Thus, where less than full cooling capacity is wanted, the immersion element can be dipped for only a fraction of its cooling length beneath the liquid surface.

Returning now to the subject of my preferred-size cooling device, where the device is of the type illustrated by FIGURE 2, an outer tube section (corresponding to tube 13 on the drawing) of about ⅞-inch diameter and about 8½ inches long, measured from its juncture with the elbow corresponding to elbow 19, ideally fulfills the above-noted requirements. The preferred diameter size for the inner tube of the cooler is about half an inch. The distance between the open end of the inner tube and the closed lower end of the outer tube is not critical, but I have found that a spacing here of about half an inch, measured from the points of contact of the ears with the inner wall of the outer tube, yields excellent results in a device of the size here specified. The depth of cut in the end of the inner tube to produce the aforesaid ears is suitably about ⅛ of an inch when preferred tube sizes are employed. While, as indicated, these preferred dimensions have been selected as optimum for cooler use in one-quart thermos bottles, coolers so dimensioned can also be used to good effect in liquid containers of many other sizes, such as pint, two-quart, gallon, etc., thermos bottles.

As previously indicated, the material of construction for both the inner and outer tubes of my cooling device, as well as most other parts thereof, is preferably a metal of relatively high heat conductivity. Copper is the primary example of such a metal and it is for this reason, plus the fact that internally exposed copper surfaces, such as the inside surface of copper tubing or the like, are highly resistant to corrosion, that I consider that metal and its alloys preferred construction materials for my cooler. The outside surfaces of my cooling device, and particularly those subject to immersion when the device is in normal use, should preferably be chrome-plated (where possible) principally for reasons of cleanliness (medical cleanliness thereby being achievable), but also to protect the copper, where that is the base metal, from oxidation as a result of exposure to the atmosphere.

The attached drawings show one basic type of construction for the cooling device of this invention, but it is to be understood that other types of construction yielding coolers capable of accomplishing the purposes set forth herein in substantially the manner described or indicated are within the scope of my invention. One example of such an alternative type of construction comprises the fabrication of the main part of the cooler from appropriately sized tube sections by known shaping, forming and assembling techniques without utilizing elbows and accessory fittings such as reducers or the like. To illustrate with the description of one such fabrication procedure, that part of my cooling device or cooler (as will by now be evident, the terms "cooling device" and "cooler" are employed synonymously herein) corresponding to the outer tube 13, elbow 19 and reducer 23 combination of FIGURE 2 is made from one continuous section of suitably sized tubing by appropriate bending and necking down procedures, followed by the drilling of a hole in its resulting elbow portion of proper size to receive the tube corresponding to inner tube 11 on FIGURE 2. Next, a preformed coil of capillary tubing is tailor-made to predetermined coil size and end extension length and direction specifications. The preformed coil is inserted into the larger-mouthed opening of the tube section bent and necked down as above described, end extension terminals first, and the extension intended as the inlet end of the capillary for the refrigerant is brought out through the necked opening of said tube section for soldering, or otherwise joining, to a suitable fitting.

Where construction of the cooling device proceeds along the above-described lines, an alternative strainer screen means to the chamber 16 means shown in FIGURE 2 would preferably be employed. For example, a so-called in-line strainer, a standard fitting housing a filter screen disposed transversely across the path of flow of the liquid stream, could be inserted in the refrigerant input line upstream of its point of juncture with the capillary tube (the juncture here being directly between input line and capillary tube, rather than through a screen chamber as in the FIGURE 2 device). There are various ways for tying the necked-down opening of the tube housing the capillary coil, the end of said coil extending outwardly through said necked-down opening, the input refrigerant line to the cooling device and the in-line strainer, where such is used, together in operable combination, and all are deemed sufficiently within the skill of those to whom this teaching is directed, in the light of said teaching, to obviate the necessity of here spelling out the details of such assembly techniques.

Continuing with the description of the illustrative alternative method of fabricating and constructing a cooling device in accordance with this invention, a section of straight tube of suitable cross-sectional size to serve the purpose of inner tube 11 of FIGURE 2 is eared on one end, in the manner previously described, and then threaded, uneared end first, through the preformed capillary coil in the bent and necked-down larger tube and out through the opening in the elbow section of the latter. The straight tube section is pulled through the elbow opening in the bent tube until the star formed by the ears on its internally (within the bent tube) disposed end contacts the "bottom" of the capillary coil. The straight tube is then bent into elbow shape near its uneared, or unstarred end, and the mouth of the tube nearest the bend is stretched or otherwise adjusted if necessary to a size receptive of a conical-end fitting such as that shown at 17 in FIGURE 2. A suitable conical-end fitting is then soldered, or otherwise sealingly secured, to the mouth of the tube, after which it (the tube) is pushed down into the outer larger tube section in which it is partially enclosed to the desired position (preferably with the starred end at about the same position, relative to the lower end of said larger tube section, as that shown on FIGURE 2) and the lower end of the latter is then sealed by a cap or other suitable means as suggested hereinabove. Finally, the bent and starred "inner tube" is sealingly joined to the larger outerly disposed tubular member, at the opening in the latter through which it passes, by solder or other suitable means.

Where my cooling device is made in accordance with the procedure just described, the inlet and outlet openings (through which the refrigerant flows), will normally be much more nearly aligned than are their FIGURE 2 counterparts. By "aligned," as the term is here employed, is meant parallel alignment with reference to the axis of the immersion element of the cooler. Such alignment, or lack of it, is of no critical significance with respect to the operability of my cooler.

The manner of using my cooler, as will be apparent from the foregoing description and the drawings, is relatively simple. Thus, to use the cooling device it is only necessary to insert the immersion element into the applicable container of liquid to the desired depth, start the refrigerant circulating through the cooler and leave the immersion element in place in the container until the liquid is cooled to the proper temperature. The manner in which the cooler functions, and its theory of operation, has already been explained. Also, one means of starting, stopping and controlling the flow of refrigerant through the cooling device has been discussed in connection with the description of FIGURE 1, this being the valve in the line feeding liquid refrigerant from the depicted air conditioning system to said cooling device.

Such a feed line control valve can be of any type suitable for the purpose, of which a number are well known, but is preferably a restricter valve which can be adjusted between wide open and closed positions to pass the refrigerant at varying flow rates depending upon the degree of restriction of the valve opening.

The refrigerant control valve can be of the manual control type which is opened, closed, and adjusted as to flow rate by hand to start the cooling action, control the rate of flow or temperature, etc., or it can be fitted with automatic controls such as, for example, thermostatic temperature controls. Where the valve is manually controlled it should preferably be installed in the liquid refrigerant line in close proximity to the cooling device. However, there is nothing critical about the location or design of the valving mechanism for refrigerant flow control through my cooler, and any suitable valve or flow control device, located at any operative place in the system (cooling device plus refrigerant inlet and outlet lines), can be employed within the scope of this invention. Thus, for example, a valve could be installed in the gaseous refrigerant outlet line, instead of in the liquid inlet line, if desired.

The interconnecting hoses between my cooling device and its host refrigeration system, where it "borrows" its refrigerant from such a source, can be routed in numerous ways obvious to those skilled in the art in the light of present teachings. For example, where the host refrigeration system is an automobile air conditioner, the hoses can be passed through conveniently located openings in the various parts of the body shell of the automobile, or its firewall, to T into the appropriate air conditioner lines, or they can, in some cases, be T'd into such lines within the interior of the car without the necessity of passing through any wall or other barrier. Where the cooler is to be installed for use in the driver's compartment of an automobile, a conveniently located rack or other holding arrangement can be easily constructed under the dash or elsewhere to provide a readily accessible place of storage for the device when not in use.

It has previously been emphasized that metals and alloys of high heat conductivity, such as copper, are preferred materials of construction for my cooler, but it has also been made clear that this invention is not limited to the use of much materials. Thus, under certain circumstances, metals or alloys much less heat conductive than copper could be used profitably in the construction of my cooling device, an example of one such being stainless steel. Stainless steel possesses certain advantages over copper which render it superior to the latter metal for my purposes in some instances. The most obvious advantage of stainless steel over copper is its much greater resistance to corrosion and oxidation; another advantage resides in its qualities of superior hardness and toughness, by contrast with the relative softness and ductility of copper. The latter qualities of stainless steel impart excellent resistant to usage abuse to coolers made in accordance with this invention from that alloy (sometimes hereinafter referred to as stainless). Even the relatively low heat conductivity of stainless, as compared to copper, is sometimes considered an advantage in that it serves to slow the otherwise rapid cooling action of my cooler and keep it within easily manageable bounds. These cases are relatively rare, however, and illustrate the exception rather than the rule.

Where coolers in accordance with this invention are made from stainless steel, the parts will normally be joined, where necessary, by welding means. For best results from the standpoint of corrosion resistance, as well as cleanliness, the steel parts of the cooler should be properly surface-finished, in accordance with any known technique for accomplishing this, insofar as possible.

I have determined by actual construction and use of a cooling device in accordance with this invention that the device is capable of rapid cooling action and that its performance is otherwise consistent with the teachings herein. More specifically, I have constructed and used a device conforming in size and shape details to the preferred specifications set forth above, in method of construction to that shown in FIGURE 2, and in materials of construction to the preferred copper and chrome-plated copper materials. My use of this device consisted of circulating a Freon refrigerant therethrough in the manner taught herein and rapidly cooling liquid beverages by briefly inserting its immersion element therein. This beverage cooling procedure was repeated many times and the device fully lived up to its expectations during each period of use.

It will be apparent from the foregoing that many embodiments of my invention are theoretically possible, and that cooling devices varying as to non-critical features and construction materials in many ways but still within the spirit and scope of my invention can be prepared by following the teachings herein. For example, the cross-sectional configuration of either the inner or outer tubular member, or both, of the immersion element of my cooler can vary from the circular if desired. Also, the size of the unit, as previously indicated, can vary, since the essence of my invention resides in the unique construction of my device and its manner of operation, rather than its size. Thus, it would be possible, for example, to construct a cooler of sufficient size to cool large tanks or containers of liquid, and of sufficient cooling capacity to require its own refrigerating system, within the purview of this invention. While the use of fins on the immersion element of my cooler, or other heat transfer or distributing gimmicks known to design engineers, is within the realm of my invention, one of the chief factors contributing to the utility of my cooling device is its ability to reach and cool liquids in narrow-mouthed containers and the fact that the cooler has inherently more than enough cooling capacity to make this kind of cooling action possible without the aid of fins or the like. In this connection, the cooling capacity of my device is inherently so high as to normally preclude the necessity or desirability of increasing the heat transfer surface of its immersion element by fins or the like and thereby permit the design and utilization of a simple, unfinned immersion element of sufficient slenderness to readily pass through the narrow mouths of thermos bottles or other liquid containers.

Other specific areas of permissible variation in non-critical features of my invention include the material of construction area (many metals and alloys other than those specifically covered, such as, for example, silver, aluminum, etc., can be employed) and the area of refrigerant input and output port design and cooperating hardware. As a specific example of the latter, there is no necessity for the horizontal legs of elbows 17 and 19 of the FIGURE 2 embodiment to be on parallel axes and they could deviate from such parallelism to any extent within the scope of this invention. It is, of course, preferred that the horizontal elbow legs be axially parallel for reasons of convenience in the handling of the unit.

In view of the many theoretically possible embodiments of my cooling device, it is emphasized that all such which maintain a structural character consistent with the integrity of the invention as taught herein fall within the scope of the invention, so long as they are encompassed by the claims following hereinafter.

I claim:

1. An immersion type cooling device for cooling liquids, comprising:
   (a) a first elongated hollow member, enclosed at one end, forming an outer shell for an immersion element for said cooling device;
   (b) a second elongated hollow member of smaller cross-sectional area than and positioned largely in floating relationship within said first elongated hollow member, said second elongated hollow member having one end in open communication with the interior of said first elongated hollow member;

(c) means securing the resulting innerly disposed hollow member within the resulting outerly disposed hollow member in the above-indicated positional relationship thereto;

(d) a capillary tube spirally coiled around said innerly disposed hollow member, said capillary tube having a first of its two ends vented to the space between the outer walls of said innerly disposed hollow member, and the inner walls of said outerly disposed hollow member; and (e) inlet and outlet means adequate to permit the passage of compressed liquid refrigerant into the second of the two ends of said capillary tube and gaseous refrigerant out of the space into which the said first of the two ends of the capillary tube is vented, respectively, whereby compressed liquid refrigerant can be passed into said capillary tube, expanded therefrom into said space between the outer walls of said innerly disposed hollow member and the inner walls of said outerly disposed hollow member, as a result of which it evaporates and absorbs heat from its surroundings, and then withdrawn from the cooling device in gaseous form, said inlet and outlet means being disposed each in a separate one of the innerly and outerly disposed hollow members.

2. The cooling device of claim 1, in which said first and said second hollow members are each of tubular configuration;

(a) the positional relationship between said elongated members is one of concentricity; and (b) the means for firmly securing said innerly disposed hollow member within said outerly disposed hollow member comprises integral ears extending divergingly away from its open end within said outerly disposed hollow member, the outer ends of said ears bearing resiliently against the inner walls of said outerly disposed hollow member to thereby firmly hold the end of said innerly disposed hollow member in place within said outerly disposed hollow member.

3. The cooling device of claim 1 in which said first elongated hollow member, said second elongated hollow member and said capillary tube are all made of copper and the first elongated hollow member has chrome-plated outer surfaces.

4. A cooling device adapted for cooling liquids confined in relatively narrow-mouthed containers, having an immersion element designed to pass through the mouth of such a container and into the contents thereof, comprising:

(a) a first tubular member enclosed at one end forming an outer shell for said immersion element;

(b) a second tubular member, of smaller cross-sectional area than, and positioned partially concentrically within, said first tubular member, said second tubular member having its interiorly disposed end open and in relatively close proximity to the closed end of said first tubular member, said second tubular member being substantially concentrically supported within said first tubular member by suitable support means;

(c) support means for the interiorly disposed open end of the second tubular member comprising a plurality of ears integral therewith, said ears extending divergingly away from said open end of said tubular member and having their outer ends bearing resiliently against the inner walls of the outerly disposed first tubular member;

(d) a first elbow sealingly secured to the non-enclosed end of the first tubular member, said elbow having an opening of suitable size, shape and location to permit passage of the second tubular member therethrough;

(e) sealing and fastening means between the edges of the opening in said first elbow and the outer walls of said second tubular member projecting therethrough;

(f) a second elbow sealingly secured to the end of said second tubular member disposed outside of said first tubular member;

(g) separate means for receiving the ends of hoses in coupling relationship sealingly secured to said first and second elbows, respectively, said means secured to said first elbow having internal means adaptable for sealed juncture with a capillary tube and said means secured to said second elbow being in open communication therewith; and (h) a capillary tube spirally coiled around said innerly disposed second tubular member, said capillary tube having a first section extending from the end of its spirally coiled portion nearest the open end of said second tubular member having said ears integral therewith to open end terminus within the space between the walls of said first elbow and said second tubular member, and a second section extending from the opposite end of its spirally coiled portion to sealed juncture with said internal means adaptable therefor in the means for receiving the end of a hose in coupling relationship sealingly secured to said first elbow;

(i) whereby compressed refrigerant can be passed into and through said capillary tube through said means for receiving the end of a hose secured to said first elbow, expanded therefrom into the annular space between the inner walls of said first tubular member and the outer walls of said second tubular member, as a result of which it evaporates and absorbs heat from its surroundings, circulated from said annular space into the interior of said second tubular member and from there out of the cooling device through said means for receiving the end of a hose in coupling relationship sealingly secured to said second elbow; when hoses suitably tied into a refrigeration system are appropriately coupled to said separate means for receiving the ends of hoses in coupling relationship sealingly secured to said first and second elbows, respectively.

5. The cooling device of claim 4 in which said first tubular member, said second tubular member and said capillary coil are made of copper and the first tubular member has chrome-plated outer surfaces.

6. In combination:

(a) the cooling device of claim 4;

(b) a source of compressed liquid refrigerant;

(c) receptive means for gaseous refrigerant;

(d) hoses interconnecting said source of compressed liquid refrigerant and said receptive means for gaseous refrigerant with the separate means for receiving the ends of hoses in coupling relationship sealingly secured to the first and second elbows of said cooling device of claim 4, respectively; and (e) means for controlling the flow of refrigerant, (f) whereby liquid refrigerant can be caused to flow into said cooling device, evaporate therein and exit therefrom in gaseous form in the manner and with the result set forth in part (i) of claim 4, at will.

7. The combination of claim 6 in which the resulting coupling connections between the interconnecting hoses of part (d) and the separate means for receiving the ends of hoses in coupling relationship sealingly secured to the elbows of the cooling device, set forth in part (d), are enclosed by a pistol-grip cover of thermal insulating material.

8. The combination of claim 6 in which the source of compressed liquid refrigerant of part (b) and the receptive means for gaseous refrigerant of part (c) are integral parts of an automobile air conditioning system, and the means of controlling the flow of refrigerant is a valve in the hose interconnecting said source of compressed liquid refrigerant and said cooling device.

9. The combination of claim 6 having incorporated therein strainer means for removing solid particles from the stream of liquid refrigerant entering the capillary tube of the cooling device when said combination is in operation.

10. The invention as claimed in claim 9, in which said strainer means for removing solid particles from the stream of liquid refrigerant entering the capillary tube comprises a screen of such mesh size as to block all particles too large to pass through the capillary tube disposed transversely of said stream upstream of its point of entry into said capillary tube.

11. The invention as claimed in claim 8, in which the refrigerant in the automobile air conditioning system is a Freon refrigerant.

References Cited in the file of this patent

UNITED STATES PATENTS

| 1,780,267 | Malone | Nov. 4, 1930 |
| 2,672,032 | Towse | Mar. 16, 1954 |
| 3,055,191 | Dennis | Sept. 25, 1962 |
| 3,067,589 | Dennis | Dec. 11, 1962 |

FOREIGN PATENTS

| 223,618 | Switzerland | Dec. 16, 1942 |
| 575,680 | Germany | May 2, 1933 |